(12) United States Patent
Vilhelmsen et al.

(10) Patent No.: US 11,734,975 B2
(45) Date of Patent: Aug. 22, 2023

(54) SHORT RANGE RADAR USE IN TRANSPORTATION ACCESS SYSTEMS

(71) Applicant: Cubic Corporation, San Diego, CA (US)

(72) Inventors: Tom Vilhelmsen, Holbaek (DK); Richard Rowlands, Kent (GB); Thomas Barrack, Copthorne (GB); Steffen Reymann, Guildford (GB)

(73) Assignee: Cubic Corporation, San Diego, CA (US)

( * ) Notice: Subject to any disclaimer, the term of this patent is extended or adjusted under 35 U.S.C. 154(b) by 116 days.

(21) Appl. No.: 17/197,880

(22) Filed: Mar. 10, 2021

(65) Prior Publication Data

US 2021/0287468 A1 Sep. 16, 2021

Related U.S. Application Data

(60) Provisional application No. 62/987,526, filed on Mar. 10, 2020.

(51) Int. Cl.
*G07C 9/10* (2020.01)
*G06N 20/00* (2019.01)
(Continued)

(52) U.S. Cl.
CPC ............. *G07C 9/10* (2020.01); *G01S 13/89* (2013.01); *G06N 20/00* (2019.01); *G06Q 50/30* (2013.01)

(58) Field of Classification Search
CPC . G07C 9/10; G01S 13/89; G01S 7/003; G01S 7/412; G01S 7/417; G01S 13/87;
(Continued)

(56) References Cited

U.S. PATENT DOCUMENTS 9,928,425 B2 3/2018 Kuznetsov et al.
2002/0130804 A1* 9/2002 McMakin ............... G01S 7/41
342/60

(Continued)

FOREIGN PATENT DOCUMENTS

EP 2204783 A1 7/2010
FR 2972270 A1 9/2012

OTHER PUBLICATIONS

Anonymous: "AI at Airports: How is Artificial Intelligence Speeding Up Security?", Jan. 23, 2019, pp. 1-9, XP055796884, Retrieved from the Internet: URL:https://www.airport-technology.com/features/ai-at-airports-security/, retrieved on Apr. 19, 2021, the whole document.

(Continued)

*Primary Examiner* — Joseph H Feild
*Assistant Examiner* — Rufus C Point
(74) *Attorney, Agent, or Firm* — Mughal IP P.C.

(57) ABSTRACT

A transportation system for identifying an object using a short range radar at a transportation gate. The transportation system includes one or more short range radars and a cloud server. The radars detect the object within a predetermined distance from the transportation gate and sense the object to generate a point cloud. An identification of the object is determined based on sensed data of the object using a machine learning algorithm from the cloud server. The identification is determined based on matching the point cloud with a plurality of profiles. The plurality of profiles includes matching information for a plurality of predetermined objects. The object is selected from the plurality of predetermined objects using the matching information. An authorization for the object is determined using another machine learning algorithm. Based on the authorization, (Continued)

either the passage through the transportation gate is authorized or the object is flagged as unauthorized.

20 Claims, 13 Drawing Sheets

(51) Int. Cl.
*G01S 13/89* (2006.01)
*G06Q 50/30* (2012.01)

(58) Field of Classification Search
CPC ...... G01S 13/887; G06N 20/00; G06Q 50/30; G06Q 10/00
See application file for complete search history.

(56) References Cited

U.S. PATENT DOCUMENTS

| 2004/0001142 | A1* | 1/2004 | Kumhyr | G06V 20/52 348/E7.086 |
|---|---|---|---|---|
| 2005/0110672 | A1* | 5/2005 | Cardiasmenos | G01N 21/3581 250/330 |
| 2006/0066469 | A1* | 3/2006 | Foote | G01S 13/887 342/179 |
| 2008/0174401 | A1* | 7/2008 | Reilly | G06K 9/6289 340/5.2 |
| 2009/0089107 | A1* | 4/2009 | Angell | G08B 13/1961 705/318 |
| 2009/0322873 | A1* | 12/2009 | Reilly | G01S 7/411 348/143 |
| 2010/0191124 | A1* | 7/2010 | Prokoski | G16H 30/20 600/473 |
| 2011/0080315 | A1* | 4/2011 | Reilly | G01V 11/00 342/175 |
| 2017/0365118 | A1* | 12/2017 | Nurbegovic | G01V 5/0008 |
| 2020/0081418 | A1* | 3/2020 | Dyne | G05B 19/4155 |
| 2021/0067350 | A1* | 3/2021 | McClintock | H04L 9/3268 |

OTHER PUBLICATIONS

Migliaccio, et. al., "MMW Imaging Using Polarimetric Measurements", 2019 16th European Radar Conference (EURAD), Euma, 2, Oct. 2019, pp. 265-268, XP033663858, retrieved on Nov. 18, 2019, abstract; figures 3-9, Introduction; p. 265 Conclusion; p. 268.

Kumar, et al., "Big Data Analytic Using Cloud Computing", 2015 2nd International Conference on Advances in Computing and Communication Engineering, IEEE, May 1, 2015, pp. 667-672, XP032798793, DOI: 10.1109/ICACCE.2015.112, ISBN: 978-1-4799-1733-4, retrieved Oct. 23, 2015, abstract.

Strom, Eifeh: "Facial Recognition Helps Airports Tackle Access Control Head On", asmag.com, Sep. 4, 2017, pp. 1-5, XP055796902, Retrieved from the Internet: URL:https://www.asmag.com/showpost/23638.aspx, retrieved Apr. 19, 2021, whole document.

* cited by examiner

SHORT RANGE RADAR USE IN TRANSPORTATION ACCESS SYSTEMS

This application claims the benefit of and is a non-provisional of U.S. Provisional Application Ser. No. 62/987,526 filed on Mar. 10, 2020, which is hereby expressly incorporated by reference in its entirety for all purposes.

BACKGROUND

This disclosure relates in general to fare gates in transportation systems and, not by way of limitation, to use of short range radars and machine learning techniques at the fare gates for distinguishing passengers from luggage and other passengers.

In a transportation system, passengers enter through the fare gates to access the transportation system after authorization. The passengers generally travel with luggage and/or handbags and hence take longer time to enter through the fare gates. Such situation may lead to tailgating incidents. Therefore, it is necessary to prevent other passengers from passing through a fare gate at the same time as a paid passenger.

Preventing tailgating at the fare gates will ensure that one passenger enters the fare gate at a time and that each passenger travelling through the transportation system has paid the cost of the travel. This enables maintaining an accurate count of the passengers entering through the fare gates. Tracking the count of the passengers may help secure a revenue associated with the transportation system.

SUMMARY

In one embodiment, the disclosure provides a transportation system for identifying an object using a short range radar at a transportation gate. The transportation system includes one or more short range radars and a cloud server. The radars detect the object within a predetermined distance from the transportation gate and sense the object to generate a point cloud. An identification of the object is determined based on sensed data of the object using a machine learning algorithm from the cloud server. The identification is determined based on matching the point cloud with a plurality of profiles. The plurality of profiles includes matching information for a plurality of predetermined objects. The object is selected from the plurality of predetermined objects using the matching information. An authorization for the object is determined using another machine learning algorithm. Based on the authorization, either the passage through the transportation gate is authorized or the object is flagged as unauthorized.

In another embodiment, the disclosure provides a transportation system for identifying an object using a short range radar at a transportation gate. The transportation system includes one or more short range radars and a cloud server. The one or more short range radars are configured to determine the object within a predetermined distance from the transportation gate. The object is sensed by the one or more short range radars at the transportation gate to generate a point cloud. The object includes one or more items associated with each other. The cloud server includes a machine learning library. The machine learning library includes a plurality of machine learning algorithms. The cloud server is configured to determine an identification of the object based on sensed data of the object using a first machine learning algorithm. The identification is determined based on matching the point cloud with a plurality of profiles. The plurality of profiles includes matching information for a plurality of predetermined objects. The object is selected from the plurality of predetermined objects using the matching information. An authorization is determined for the object to pass through the transportation gate using a second machine learning algorithm. A subset of the plurality of predetermined objects are authorized. In response to determination of the authorization, either a passage through the transportation gate is authorized or the object is flagged as being unauthorized.

In still embodiment, the disclosure provides a method of identifying an object using a short range radar at a transportation gate. The object is detected within a predetermined distance from the transportation gate. The object is sensed at the transportation gate using the short range radar to generate a point cloud. The object includes one or more items associated with each other. An identification of the object is determined based on data from the sensing using a first machine learning algorithm. The identification is determined based on matching the point cloud with a plurality of profiles. The plurality of profiles includes matching information for a plurality of predetermined objects. The object is selected from the plurality of predetermined objects using the matching information. An authorization is determined for the object to pass through the transportation gate using a second machine learning algorithm. A subset of the plurality of predetermined objects are authorized.

In response to determining the authorization, either a passage through the transportation gate is authorized or the object is flagged as being unauthorized.

In an embodiment, the disclosure provides software to cause a transportation system to:
- detect an object within a predetermined distance from a transportation gate of the transportation system;
- sense the object at the transportation gate using a short range radar to generate a point cloud, wherein the object includes one or more items associated with each other;
- determine an identification of the object based on data from the sensed object using a first machine learning algorithm, the identification is determined based on matching the point cloud with a plurality of profiles, the plurality of profiles includes matching information for a plurality of predetermined objects, and the object is selected from the plurality of predetermined objects using the matching information;
- determine an authorization for the object to pass through the transportation gate using a second machine learning algorithm, wherein a subset of the plurality of predetermined objects are authorized;
- in response to determination of the authorization, either authorize a passage through the transportation gate or flag the object as being unauthorized.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a second alphabetical label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

Figure 1:
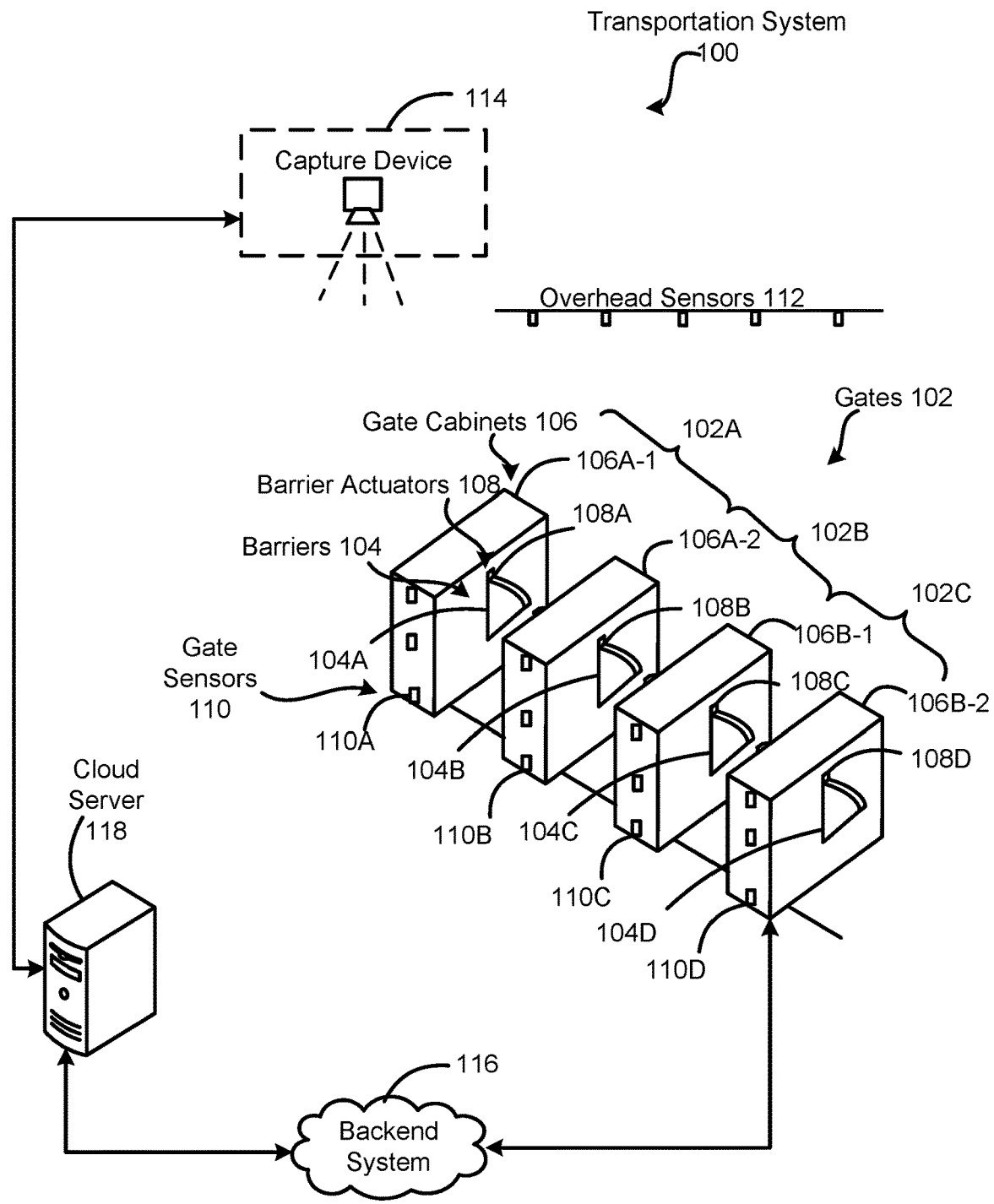
FIG. 1 illustrates a block diagram showing an embodiment of a transportation system.

Referring to FIG. 1, illustrates a transportation system 100 including a gate 102 or an access control point or a transit gate to allow a transit user to move through the gate 102 within the transportation system 100. The transportation system 100 includes the gates 102A, 102B, 102C, barriers 104A, 104B, 104C, 104D, gate cabinets 106A-1, 106A-2, 106B-1, 106B-2, barrier actuators 108A, 108B, 108C, 108D, gate sensors 110A, 110B, 110C, 110D, overhead sensors 112, a capture device 114 (e.g., a video or still camera), a backend system 116, and a cloud server 118.

The gate 102 also be referred as the "transportation gate" may specifically refer to a portion of the transportation system 100 through which the passengers pass to gain access to and/or exit from certain areas. For example, subway stations, train stations, etc. or modes of transportation within the transportation system 100. The gate 102 may separate a restricted access area from a non-restricted access area within the transportation system 100. Examples of the restricted access area may include a transportation platform (e.g., bus platform, train platform, airports, ports, etc.), the inside of a transportation station (e.g., bus station, train station, etc.), the inside of a transit vehicle (e.g., bus, train, etc.), the inside of a building, the inside of a concert venue, and the like.

The gate 102 may or may not include a physical barrier such as the barriers 104 allowing or denying access through the transportation system 100. The gate 102 may include a single or a pair of the paddles or the barriers 104 that may be retractable or rotatable so as to move between an open position and a closed position. For example, by means of removal of a physical barrier, unlocking of the physical barrier, and/or providing an indication like a sound, light, image on the display, etc. indicating that the passenger may proceed through the gate 102. In an embodiment, the barrier 104 is closed by rotating the barrier 104 until it becomes parallel with one of a set of the gate cabinets 106. The barrier actuator 108 is mounted on the barrier 104 to move the barrier 104 between the open position and the closed position. In another embodiment, gates 102 may be entirely passive, allowing passengers to pass through while charging them appropriately.

The gates 102 may be controlled by a gate controller (not shown), which may comprise a computing system in communication with one or more computer servers of the backend system 116 and the cloud server 118 of the transportation system 100. The backend server 116 determines whether the transit user has paid fare or is authorized for access to the transportation system 100. Based on the determination from the backend system 116, the transit user is granted access through the gates 102. Sensors (not shown) and the barrier actuators 108 in the barriers 104 enable the barriers 104 to open for the transit user to traverse through the gate 102. The backend system 116 also enables the transit user to make payment for passing through the gate 102 and using the transportation system 100. Other embodiments allow a transit pass to be electronic and managed in an application ("app") on a mobile device of the transit user that communicates with the gates 102 to allow authorization.

The gates 102 may comprise one or more fare media readers capable of reading fare-related information from a fare media presented by a passenger or the transit user to determine whether to allow the passenger access through the gates 102. The fare media may comprise a smartcard, mobile device (e.g., mobile phone), radio frequency identifier (RFID)-tagged object, paper ticket and/or other media having a magnetic stripe, bar code, QR identifier, integrated circuit capable of communicating fare-related information via wired and/or wireless means, and/or other media, from which the one or more fare readers of the gate 102 is able to read fare-related information. This information may be encrypted to help ensure the information stored by the fare media is not readable by unauthorized fare media readers.

In some embodiments, the transportation system 100 may utilize an account-based system in which transactions are paid for by crediting/debiting a value from a user account maintained by a back-office. As such, the fare-related information obtained from the fare media by the gate 102, which is sent to the backend system 116 once read from the fare media by the gate 102, may comprise sufficient identification information. For example, a username, telephone number, and/or other identifier enables the backend system 116 to identify the account of the passenger presenting the fare media, and credit/debit the account appropriately. Account types may vary depending on the services provided by the transportation system 100. That is, passengers may pay for each ride, for a number of rides, for unlimited rides over a period of time for example, on a weekly or monthly basis, and so forth.

The barrier actuator 108 may be a rotary actuator, such as a servomotor, that allows precise control of angular position, angular rate, torque, and/or angular acceleration. For example, the barrier actuator 108 may include both a rotary actuator and a sensor that provides feedback of the current angular position of the barrier actuator 108, from which a position of the barrier 104 is determined. In another embodiment, the barrier actuator 108 is a linear actuator that allows precise control of linear position, linear velocity, and/or linear acceleration of the barrier 104.

The capture device 114 captures images and/or video of the gate 102. The capture device 114 is a camera having a field of view covering at least part of the gate 102 or even a group of the gates 102. The capture device 114 may be positioned above the gate 102 and oriented downwards so as to cover the gate 102 from a top-down view. Captured images may be in the visible and/or infrared wavelengths.

The gate sensors 110 may use Radio Detection And Ranging (RADAR) sensors mounted to the inner surfaces of the gate cabinets 106. The gate sensors 110 scan across an aisle formed between the gate cabinets 106. The gate sensors 110 may include a pair of infrared (IR) transmitter/receiver beam sensors, radar sensors, ultrasonic sensors, radar sensors, or any other kind of sensor that detects the presence of objects between the sensors along the aisle formed between two gate cabinets 106.

The overhead sensors 112 are mounted above the barriers 104 and the aisle. The overhead sensors 112 may be mounted in the direction of top of a head of the incoming transit users when the barriers 104 are closed so as to detect the distance between the transit users and the barriers 104 as the transit users approach the barriers 104. The overhead sensors 112 may be radar sensors, and the like.

A 77 GHz radar may be used as the radar sensors in the gate sensors 110 and the beam sensors 112. As used generally herein, the term "radar," "mm Wave radar," and "short-range radar" may refer to radar systems utilizing a carrier frequency of 20 GHz or more. The higher the frequency of the radar, the higher the resolution of the radar scan. A radar sensor operating at 77 GHz can, for example, achieve a resolution of 3.5 cm. A radar operating at 62 GHz can achieve a resolution of 4.5 cm, for example. In some embodiments, such as those in which the radar is additionally used for metal object detection, the system transmit frequency may exceed 100 GHz (e.g., the 130 GHz to 150 GHz band). The sample rate of these radar can vary. In some embodiments, for example, the sample rate can reach 4 GHz. Alternative embodiments may have higher or lower sample rates.

The cloud server 118 includes a number of machine learning libraries accessible by the gates 102 to process data gathered by the sensors. The machine learning libraries includes various machine learning algorithms that process the gathered data and distinguish between adults and children. This may further include determining passenger counts and/or payment with the help of the backend system 116. Additionally, because the radar can distinguish between materials, other embodiments may further perform metal detection or similar threat detection. The "cloud" may comprise one or more separate devices, such as computer servers, which may be local to or remote from the gate 102. Computer servers may, for example, be distributed geographically, and may be used to propagate the machine learning libraries to various gates 102 within a transportation system 100. Additionally, according to some embodiments, the data may be gathered from the gates 102 in the transportation system 100 and used to update the machine learning libraries.

Radar data gathered by the overhead sensors 112 and the gate sensors 110 are used to scan objects around the gates 102 and near the aisle of the gate 102. The radar data is also used to determine distance and speed/velocity of the transit users as they approach the gate 102. This is helpful to detect unusual behavior or intents (for example, attempts at fare evasion, tailgating) or to prevent an accident when a child or the transit user is approaching with a high speed towards the gate 102. In another embodiment, the gate sensors 110 are placed on top and bottom of the gate cabinets 106 to detect the transit users as they enter and exit from the gate 102. Additionally, for the gates 102 that allow bidirectional travel (users can enter or exit through either end of the aisle), it can be determined which transit user is closest to the gate 102 and is therefore allowed to pass through the gate 102 prior to other transit users.

The transit user may be walking alone; with a child; with a suitcase, bag, or other object, and/or in a wheelchair or other mobility device. The overhead sensors 112, the gate sensors 110 and capture device 114 can gather information on the transit users to detect these situations automatically.

The overhead sensors 112 scan the aisle while the barrier 104 moves and identifies whether the transit user is entering the gate 102 alone, with the luggage, and/or with the child before determining the transit user is within threshold distance from the barrier 104. Based on the identification, the barrier 104 is either prevented from moving into the closed position or the open position by the barrier actuator 108 for sufficient time for the additional things that validly accompany the transit user to pass.

Data gathered by the gate sensors 110 along with the overhead sensors 112 is used to determine if a tailgating fare evasion incident for example, when two transit users walk through on a single validation is taking place. The overhead and the gate sensors 112, 110 enable a first-come-first-serve gate operation. Upon detection of a tail gating, incident is reported and a transit personnel of the transit system are alerted. Further, the data gathered by the gate sensors 110 along with the overhead sensors 112 is used to determine the actual count of the transit users passing through the gates 102.

Figure 2:
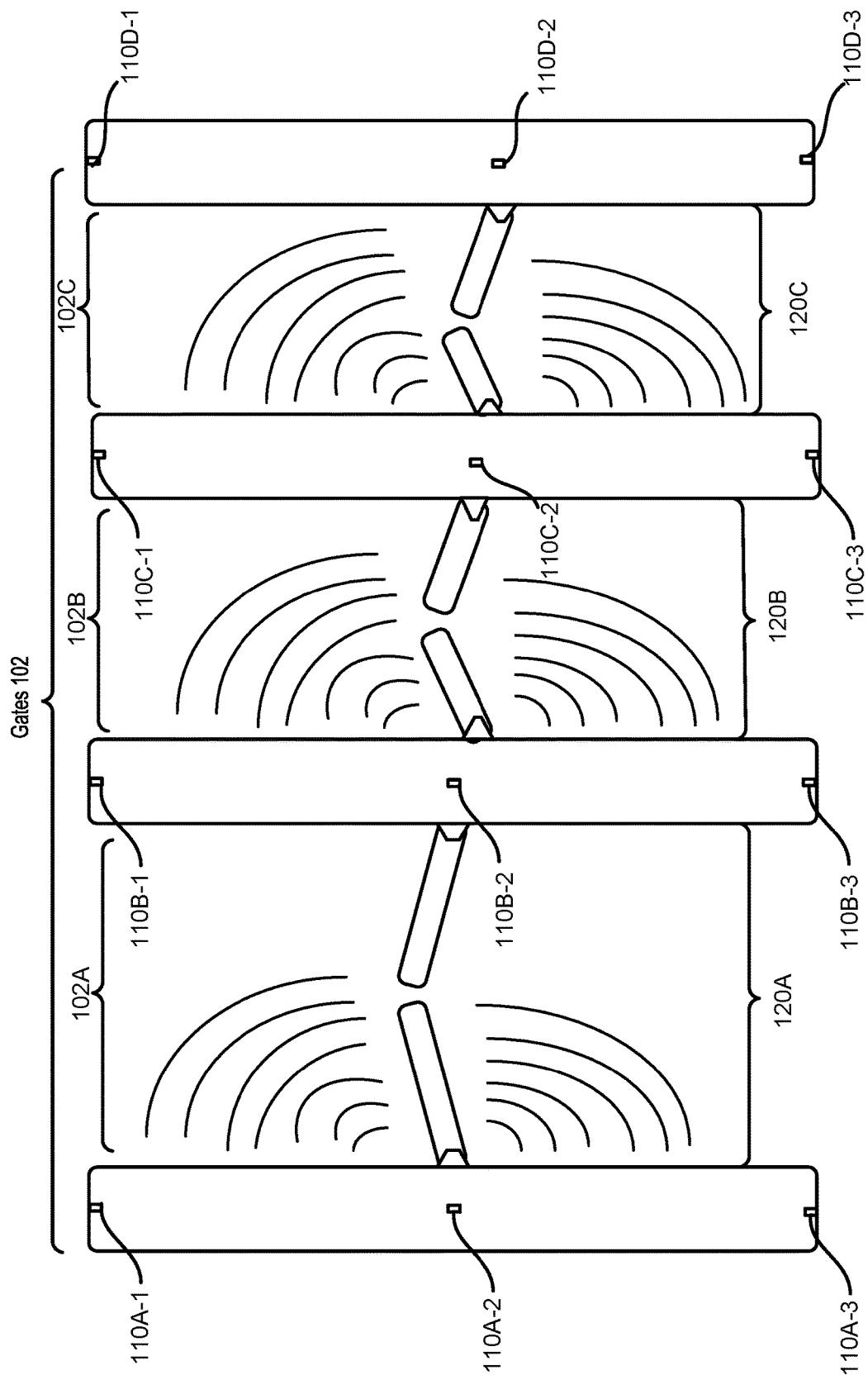
FIG. 2 illustrates a block diagram showing an embodiment of a gate.

FIG. 2 illustrates an embodiment of the gate sensors 110 vertically placed in a column within the middle of the gate cabinets 106. With a dual aspect on the aisles 120A, 120B, 120C of the gates 102A, 120B, 102C, that covers entry and exit sides of the gates 102, the gate sensors 110 may vertically and horizontally scan an area of the aisle 120. The position allows for a wider three dimensional sphere of received signal on the approach of the transit users to the aisle 120.

Figure 3:
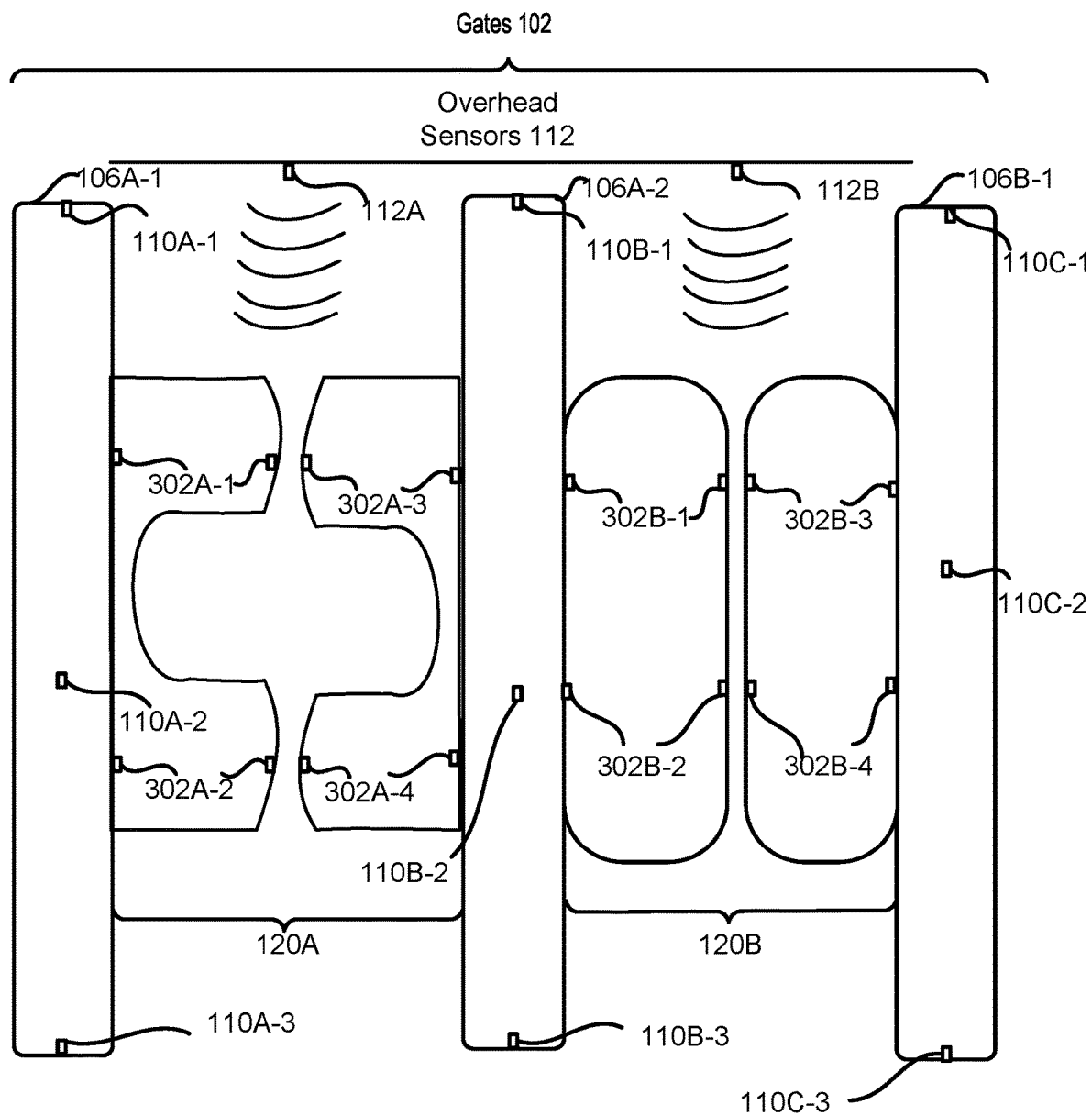
FIG. 3 illustrates a block diagram showing another embodiment of a gate.

FIG. 3 illustrates an embodiment of the overhead sensors 112 mounted in a position above the middle of the aisles 120A, 120B and between the gate cabinets 106A, 106B, 106C. The overhead sensors 112 provides a singular aspect on the gate 102, when placed at an approximate position of height. The overhead sensors 112 will be able to view and cover in a zonal pattern the aisle 120. The overhead sensors 112 scan the transit users from top of the aisle 120.

Figure 4A:
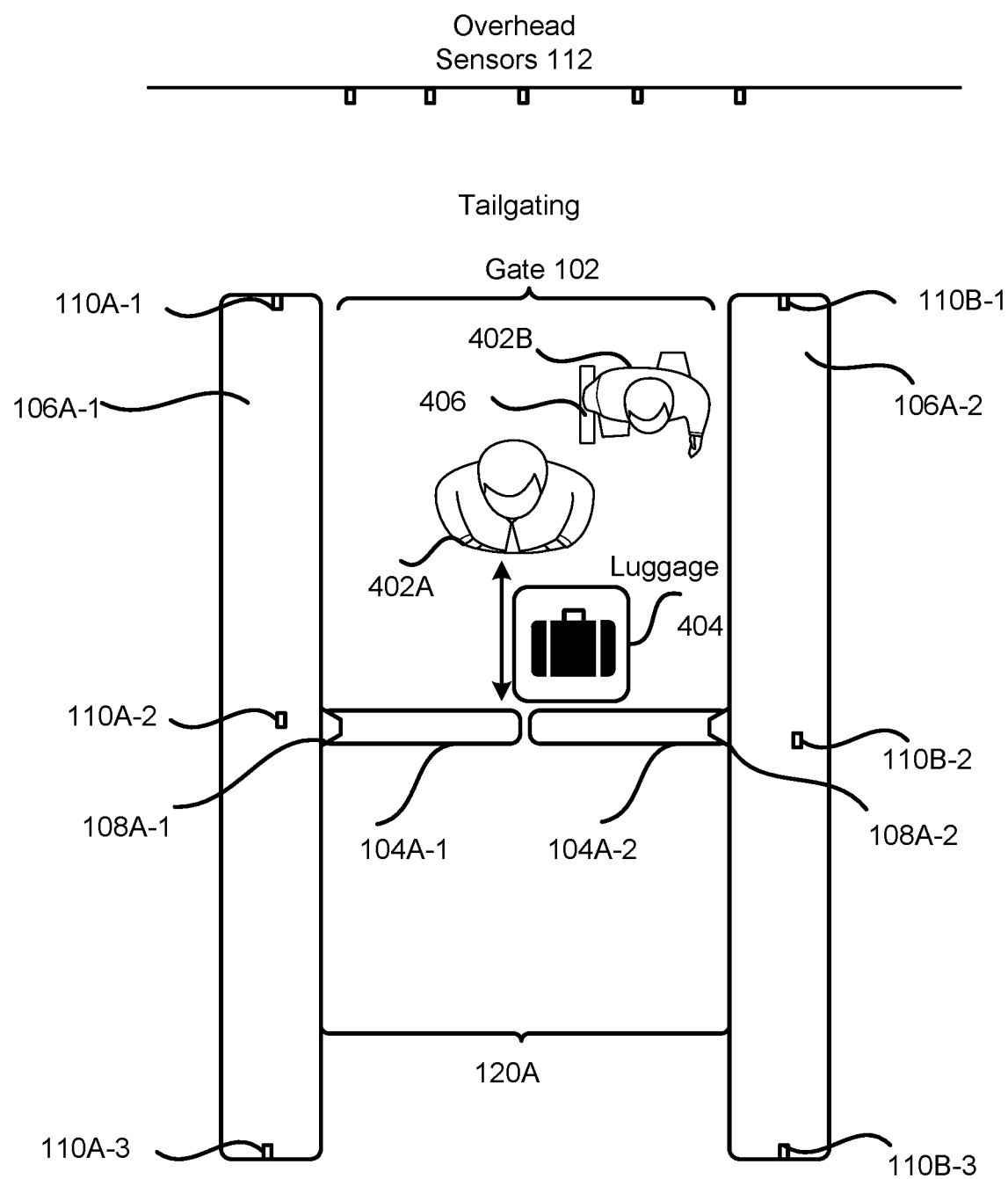
FIGS. 4A-4D illustrates block diagrams of embodiments of transit user(s) interacting with a gate.

FIG. 4A illustrates an embodiment of avoiding tail gating at the gate 102. Two transit users, a first transit user 402A and a second transit user 402B, approach the gate 102 passing along the aisle 120A. The first transit user 402A is closer to the barriers 104A-1 and 104A-2 of the gate 102 then the second transit user 402B. The first transit user 402A is travelling with a luggage 404. The first transit user 402A puts forward the luggage 404 near the gate 102. The second transit user 402B is travelling with a handbag 406. The gate sensors 110A, 110B and the overhead sensors 112 identify the first transit user 402A and the second transit user 402B along with their luggage 404 and handbag 406, respectively. The gate sensors 110 and the overhead sensors 112 scan across the aisle 120A to identify the two transit users 402 as both being likely adults based on data gathered across the gate 102. The scanning generates a cluster of spatial data including point clouds. The point cloud is matched with a matching information associated with a set of predetermined objects from a plurality of profiles in a machine learning library in the cloud server 118. The matching information is used to identify the transit users 402 and the objects 404, 406 along with them. A machine learning algorithm stored in the cloud server 118 is used to perform the identification. The barriers 104 are opened based on authorization of the first transit user 402A. Since, the first transit user 402A has placed the luggage 404 in front of the gate 102 to pass the luggage 404 which eventually will take a longer time for the first transit user 402A to enter the gate 102. A tailgating situation exists where the second transit user 402B may enter the gate 102 along with the first transit user 402A before the barriers 104 close.

In another embodiment, the transit user 402A may be travelling with a trolley bag in front, the transit user 402A may be travelling with a trolley bag and/or a satchel behind, the transit user 402A may be travelling with luggage in front and behind, or the transit user 402A may be travelling with a rucksack. There may be other different configurations of the transit user 402A travelling with different objects like luggage 404 and/or travelling alone on a wheelchair, and/or a mobility chair.

The transportation system 100 determines a distance between the first transit user 402A and the second transit user 402B and compares the distance with a predetermined distance threshold to determine a likely tailgating situation. The predetermined distance threshold may be obtained from a database (not shown) of the transportation system 100. Based on the comparison, a timing profile for opening and closing the barrier 104A-1, 104A-2 is determined. The barriers 104A-1, 104A-2 are moved by the barrier actuators 108A-1, 108A-2 from the closed position to the open position based on the timing profile in order to ascertain that a single transit user 402 pass through the gate 102 at once after authorization. Since the first transit user 402A and the second transit user 402B are close enough, the barriers 104A-1, 104A-2 are moved from the open position to the closed position based on the timing profile such that the first transit user 402A passes easily through the gate 102 with the luggage 404. For example, the timing for closing the barriers 104 A-1, 104A-2 for the first transit user 402A may be decreased so that the second transit user 402B may not enter the gate 102 while the barriers 104 are open since the second transit user 402B is close to the first transit user 402A. The timing of the barrier 104 is adjusted to close between the two transit users despite them being close together. Without a tailgating situation, the timing would normally be longer before the gate 102 closes the barrier 104 after the first transit user 402A. Also, an accurate count of the transit users 402 who have paid for travelling and entering through the gates 102 is maintained for records.

Figure 4B:
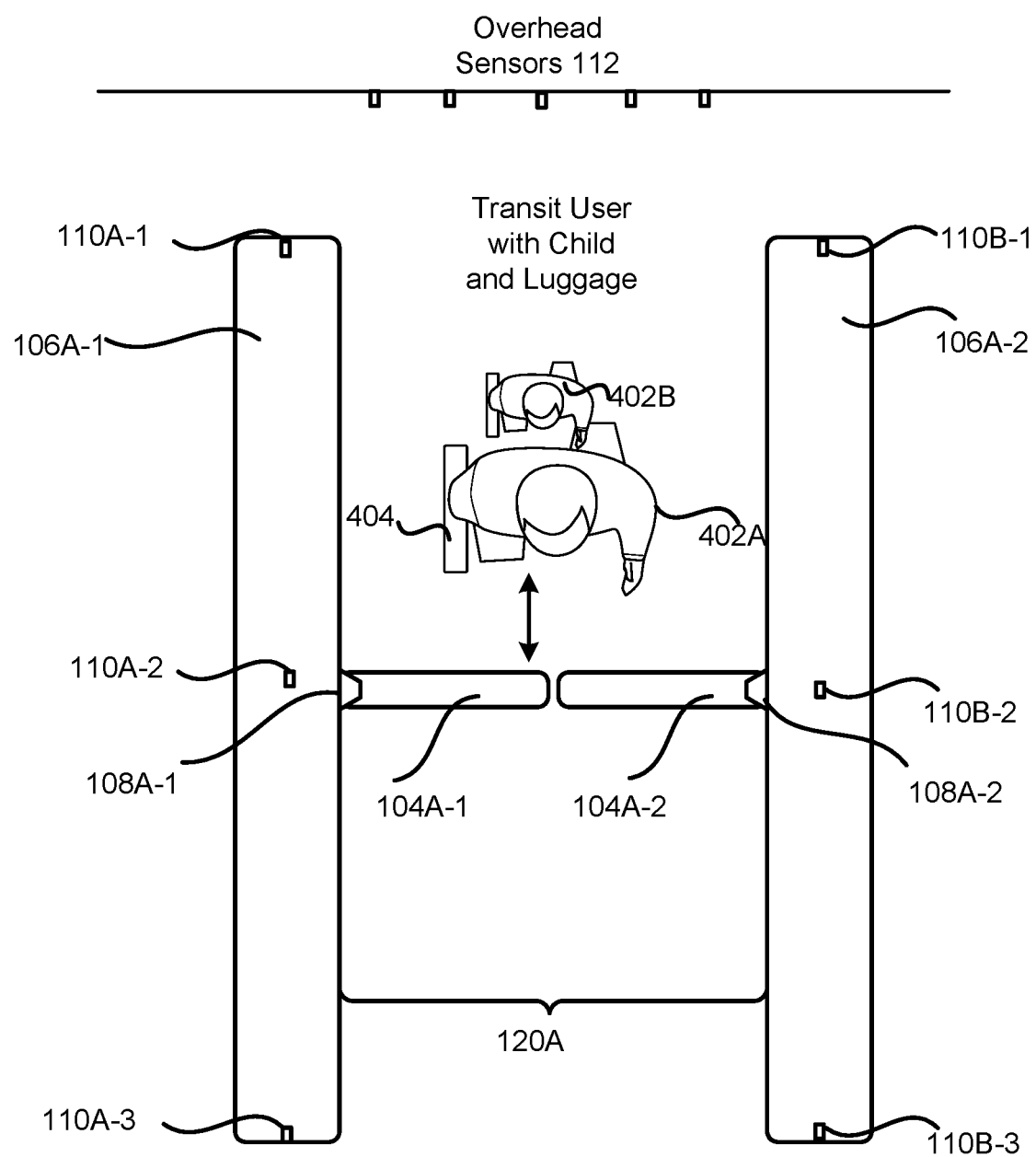

FIG. 4B illustrates an embodiment where a first transit user 402A is approaching the gate 102 with a child 402B along with an object 404 identified as a bag. The gate sensors 110A, 110B of the gate 102 along with the overhead sensors 112 detect the two transit users 402. The gate sensors 110A, 110B and the overhead sensors 112 determine a first transit user 402A as an adult and the second transit user 402B as a child with the first transit user 402A based on height information of the two transit users 402. Point clouds of the two transit users 402 are formed by the scanning performed by the gate sensors 110 and the overhead sensors 112. The point clouds are matched with matching information associated with the set of predetermined objects from the plurality of profiles in the machine learning library in the cloud server 118. The matching information is used to identify the transit users 402 and the object 404 along with them. A machine learning algorithm stored in the cloud server 118 is used to perform the identification. The barriers 104A-1, 104A-2 are opened based on authorization of the first transit user 402A and/or a privilege associated with the second transit user 402B such as a free passage. Based on the determination that the first transit user 402A is travelling with the child 402B a corresponding timing profile is selected from the database of the transportation system 100. In general, the timing profile includes that the opening time and closing time for the barriers 104 be increased. In the present embodiment, the timing profile provides that a duration for the barriers 104 to remain opened be increased in order to allow both the transit users 402 cross the barriers safely. For example, three times the usual time that the barriers 104 are opened such that the first transit user 402A may safely walk across the aisle with the child 402B. In another embodiment, the transit user 402 may be an adult travelling alone.

Figure 4C:
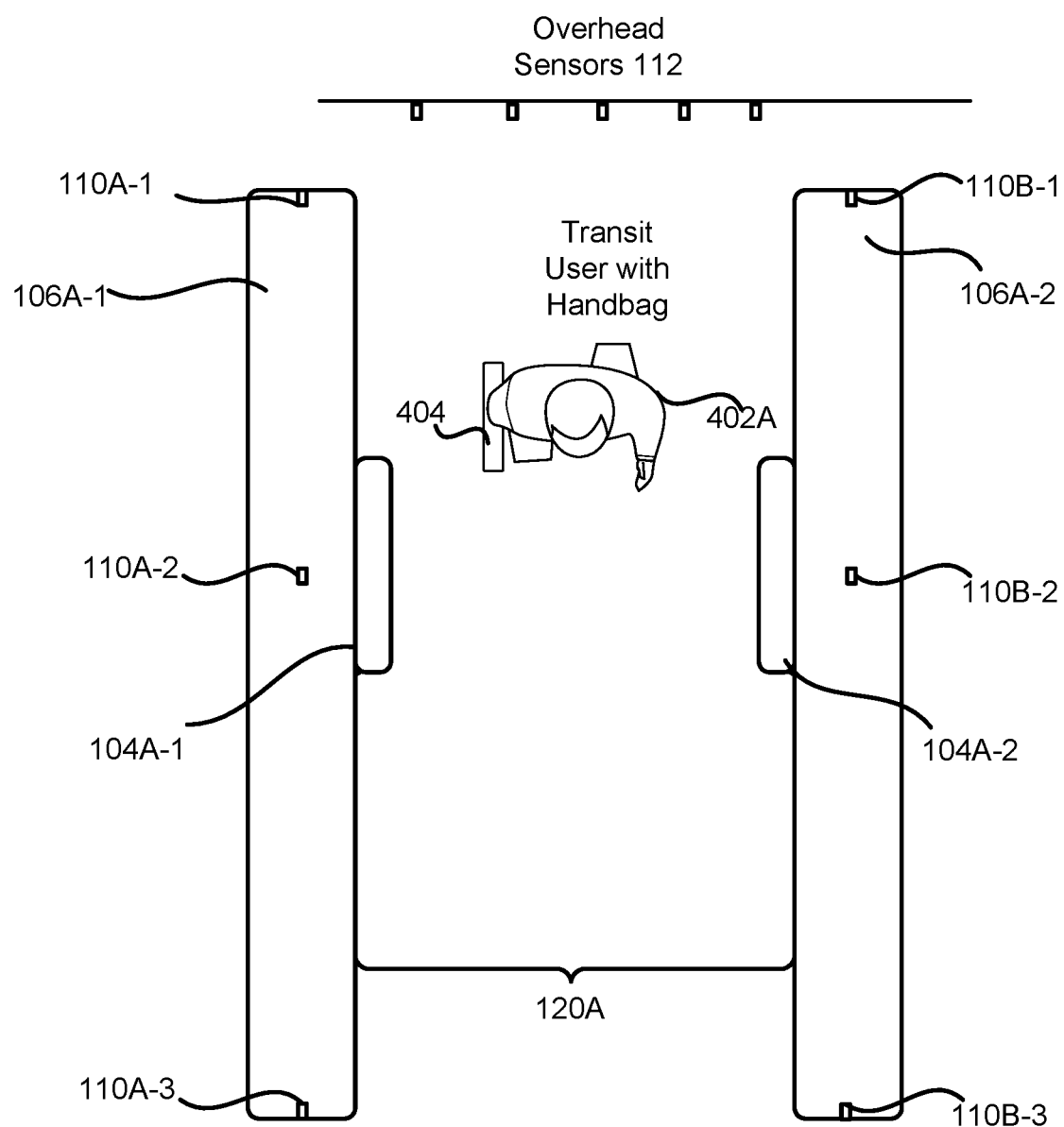

FIG. 4C illustrates an embodiment where a transit user 402A is approaching the gate 102 with a handbag 404. In other embodiments, the handbag 404 could be a roller board dragged behind the transit user 402A. The gate sensors 110 and the overhead sensors 112 scan the transit user 402A along with the handbag 404. Point cloud of the transit user 402A is formed by the scanning performed by the gate sensors 110 and the overhead sensors 112. The point clouds are matched with matching information associated with the set of predetermined objects from the plurality of profiles in the machine learning library in the cloud server 118. The matching information is used to identify the transit user 402A and the object 404 with him. A machine learning algorithm stored in the cloud server 118 is used to perform the identification. Based on the identification, a corresponding timing profile associated with the transit user 402A is implemented on the barrier 104. The timing profile may include an increased duration for the barrier 104 to remain open. In another embodiment, the transit user on a wheelchair may be identified based on the scanning performed by the gate sensors 110 and the overhead sensors 112 and the corresponding timing profile associated with the wheelchair is implemented on the barrier 104. The timing profile may include the increased duration for the barrier 104 to remain open for these circumstances.

Figure 4D:
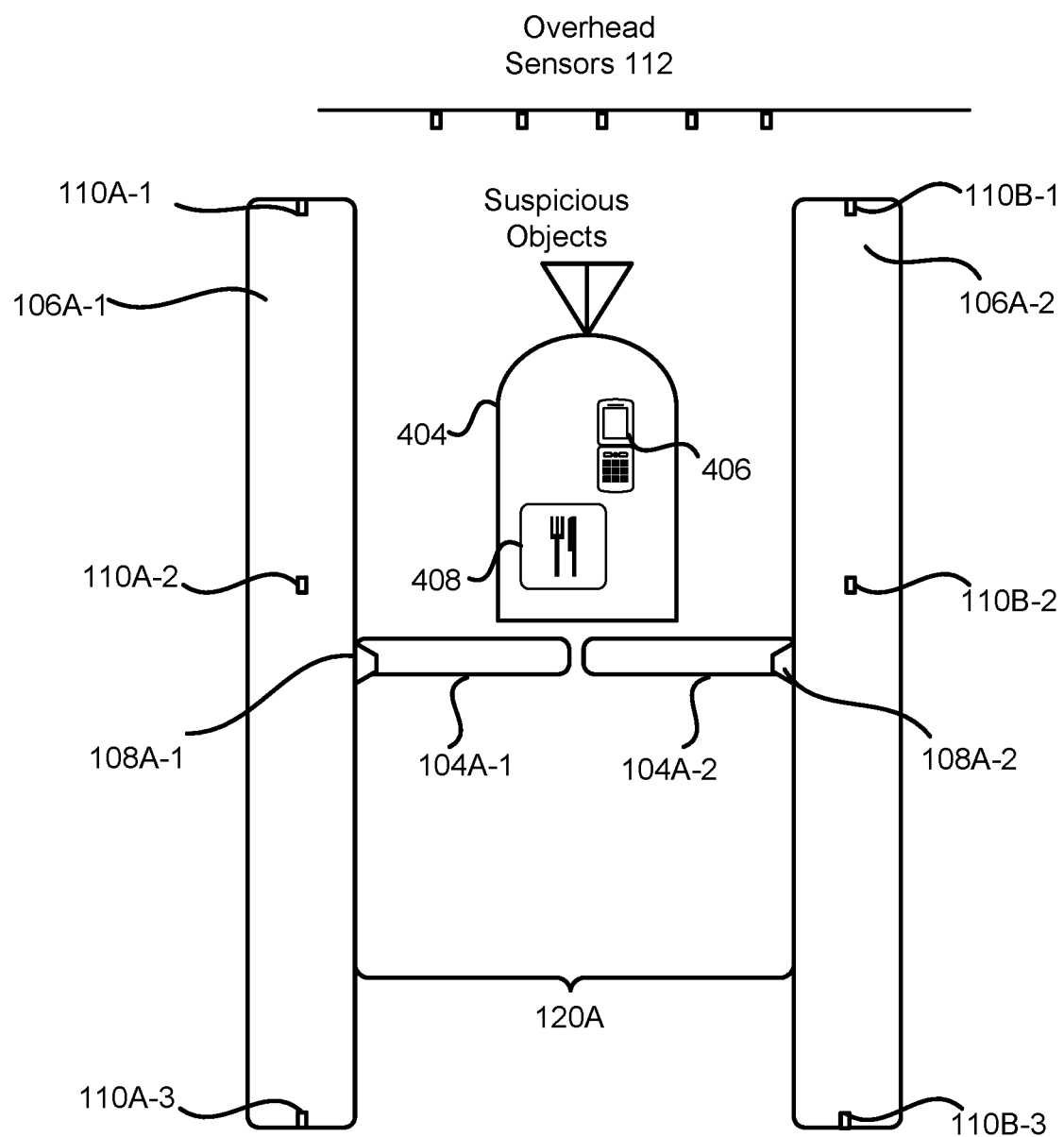

FIG. 4D illustrates an embodiment where a suspicious object 404 is placed in front of the gate 102 in an area of the aisle 120. The gate sensors 110 and the overhead sensors 112 scan the object 404 to generate a point cloud associated with the object. The point cloud of the object 404 is matched with matching information associated with the set of predetermined objects from the plurality of profiles in the machine learning library in the cloud server 118. The object 404 is matched with suspicious items from the plurality of predetermined objects the profiles. High resolution scan by the gate sensors 110 and the overhead sensors 112 is performed again to check sub-objects 406, and 408 within the suspicious object 404. The sub-object 406 is identified as a cell phone and the sub-object 408 as a knife and a fork or any other sharp object. Sub-object 408 falls under a prohibited items category in the predetermined objects from the profiles. Based on the identification of the object and/or the sub-objects 408 as suspicious item, a movement associated with the object 404 is determined. In case the movement is below a threshold speed within a threshold time, it is determined that the object 404 is static. The object is determined as a suspicious item and an alert is generated. The alert is either audible, visual or any other form of indication. A photograph of the suspicious object 404 may be captured by the capture device 114 and uploaded on/to the cloud server 118 for flagging the alert to a transportation personnel. The barrier 104 remains in a closed position for an increased duration based on a corresponding timing profile, unless the handbag 404 is removed from the aisle 120.

Figure 5:
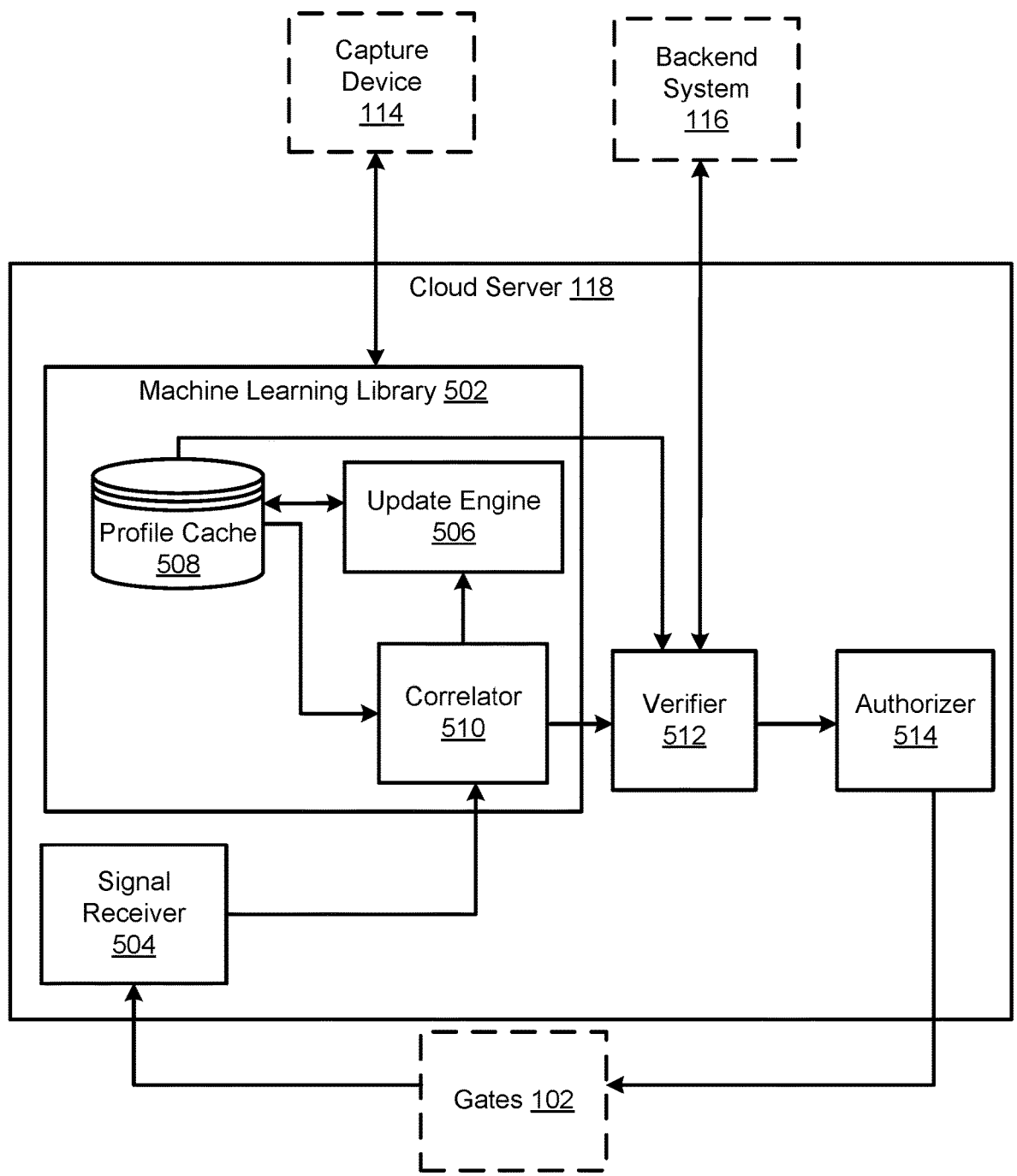
FIG. 5 illustrates a block diagram showing an embodiment of a cloud server.

FIG. 5 illustrates one embodiment of the cloud server 118 configured to match an object or a transit user in front of the gate 102 to a set of predetermined objects and further after the match, verify and authorize the object to pass through the gate 102. The cloud server 110 includes a machine learning library 502, a signal receiver 504, a verifier 512, and an authorizer 514. The object may be a transit user moving along with other objects such as a luggage, bags, and/or a wheelchair. The object may be the luggage, bags, a phone, and/or other items left or misplaced in front of the gate 102. The transit user desires to take a trip through the transportation system 100 by passing through the gate 102 which may be at entry, exit, and/or transfer points.

The machine learning library 502 includes a profile cache 508, an update engine 506, and a correlator 510. The machine learning library 502 includes a plurality of machine learning algorithms stored in the profile cache 508. The machine learning algorithms include a first machine learning algorithm used to identify the object in front of the gate 102. The machine learning library 502 includes a second machine learning algorithm used to verify whether the object should be allowed to pass through the gate 102 or denied access through the gate 102. The profile cache 508 includes a plurality of profiles that includes matching information for a plurality of predetermined objects. By way of an example, the plurality of predetermined objects may be the transit user; or the transit user with the luggage, a handbag, and/or a rucksack; and/or an item such as a prohibited item, a knife, a liquor, or a phone. Table 1 below illustrates the plurality of profiles with the plurality of predetermined objects.

TABLE 1

Machine Learning Library

| Profiles | Predetermined Objects |
| --- | --- |
| Profile 1 | 1. Transit User alone and freehand |
| Profile 2 | 1. Transit User with Carry bag in hand |
| | 2. Transit User with trolley in front |
| | 3. Transit User with trolley and satchel behind |
| | 4. Transit User with luggage in front and behind |
| | 5. Transit User with rucksack |
| Profile 3 | 1. Items such as firearm, knife, fork, gun or other weapon, belt buckle, mobile phone, liquor, perfume |
| | 2. Other prohibited items |
| Profile 4 | 1. Unidentified items |
| | 2. Threatened objects |

As illustrated in Table 1, profile 1 includes only the transit user travelling alone and free handed as a predetermined object. Profile 2 includes the transit user with a carry bag in hand, the transit user with trolley in front, the transit user with trolley and satchel behind, the transit user with a luggage in front and behind, and the transit user with rucksack. Profile 3 includes different types of items like firearm, knife, gun or other weapon, belt buckle, mobile phone, liquor, perfume, and/or prohibited items. Profile 4 includes those objects that are unidentified that is the profiles for those objects are not stored in the profile cache 508. The profile 4 also includes threatened objects that may pose danger to life or property of the other passengers and/or cause any kind of damage to the transportation system 100. The object in front of the gate 102 is matched with the predetermined objects from these profiles by the first machine learning algorithm to identify the object in the correlator 510.

The signal receiver 504 receives data from the sensing of the object at the gate 102 by the gate sensors 110 and the overhead sensors 112. The gate sensors 110 and the overhead sensors 112 are radar sensors. The received data is collated and a point cloud of the object is produced. Further, higher resolution sensing of the object may produce point cloud of sub-objects that are smaller objects such as pen, phone, wallet, or bottle within the object such as a handbag. The point cloud is a cluster of the received data. The point cloud is a set of data points in space produced from the data of the gate sensors 110 and the overhead sensors 112. The data points are a three-dimensional (3D) representation of the object. The point cloud of the object and/or the sub-objects is provided to the correlator 510 for further processing.

The capture device 114 may also provide captured images and/or videos of the object to the correlator 510 for identification of the object.

The correlator 510 compares the point cloud of the object obtained from the signal receiver 504 to the plurality of predetermined objects from the plurality of profiles using the first machine learning algorithm. The correlator 510 may also use the captured images and/or the videos of the object by the capture device 114 for comparison. Based on the comparison, the object is identified. The object is selected from the plurality of predetermined objects using the matching information. Further, the identification of the object is updated in the profiles of the profile cache 508 by the update engine 506. The identification of the object is provided to the verifier 512 for further processing when the object is identified as the transit user. In case the object is identified as an item from the profile 3 and the profile 4, an alert is generated to a transit personnel and/or an audio or visual alarm signal is signaled regarding the object. Images of the object from the capture device 114 may also be sent along with the alert to the transit personnel or security staffs.

The update engine 506 receives the identification of the object from the correlator 510 and compares the identification of the object with the matching information of the predetermined objects from the profiles. The update engine 506 provides the identification of the object to the profile cache 508 for updating the profiles with the identification of the object. In case, the object is identified as a new object that is not found in the existing profiles, the update engine 506 adds the identification of the new object in the profile cache 508. The profile cache 508 is updated each time the object is identified by the correlator 510.

The verifier 512 on receiving the identification of the object, sends a notification on a mobile device of the object when the object is identified as the transit user. The notification may be sent on the mobile device via a mobile application (app), email, short message service (SMS); and/or may be transmitted as an audible or visual indication. The notification includes a request for a transmit pass or other verification of the transit user. On receiving the notification, the transit user provides the transmit pass to the verifier 512. The transit pass may be a digital card, a physical card, a QR or bar code on the mobile app, a biometric, and/or other verification means.

The verifier 512 uses the second machine learning algorithm from the profile cache 508 to extract terms of the transit pass and further verifies the terms against a set of predetermined rules stored in the verifier 512. The terms of the transit pass include balance against a current trip, minimum balance for the current trip, privileges associated with the transit pass such as a free or discounted ride for senior citizens, children, and/or passengers, or gift coupons associated with the transit pass. Verifying the terms of the transit pass validates that the transit user has paid for the trip and/or is privileged to take the trip till an expiry of the transit pass.

In case the transit user has either not paid and/or is not privileged to take the trip, the verifier 512 transmits a notification on the mobile device of the transit user to a make the payment for the trip. The payment may be made using the backend system 116 that stores authorization information for the transit users and the rules associated with approving use. After verifying the terms of the transit pass and/or completion of the payment against the trip of the transit user, the verifier 512 indicates its verification to the authorizer 514 for further processing.

The authorizer 514 determines whether the transit user is within a certain distance from the barriers 104 or the gate 102 (when the gates 102 do not include barriers 104). The transit user is validated by the authorizer 514 to pass through one of the gates 102 based on the verification. The authorizer 514 sends a notification to the backend system 116 to provide access to the transit user. Sensors, motors and actuators of the gate 102 and/or the barriers 104 are signaled by the backend system 116 to open when the transit user is within the certain distance from the barriers 104 and/or the gate 102. The transit user traverses the gate 102 using the transit pass after the barriers 104 and/or the gate 102 is opened.

Figure 6A:
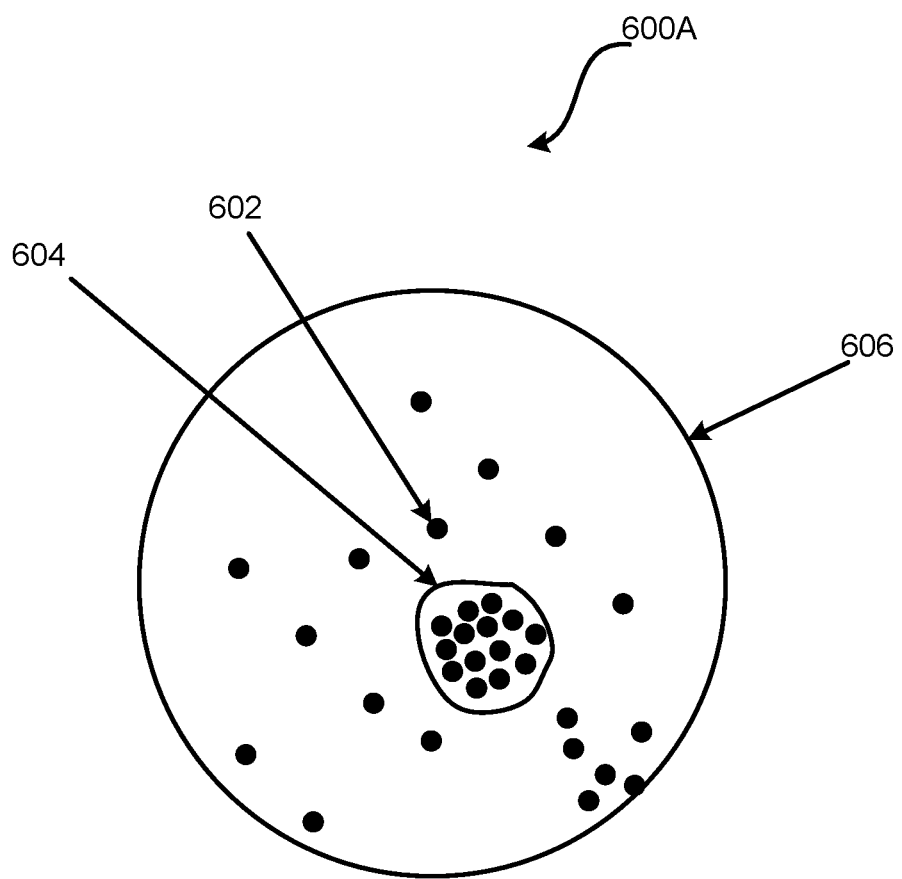
FIGS. 6A-6B illustrates block diagrams of representations of point cloud data of objects.

FIG. 6A illustrates a representation 600A of point cloud data or point data references of the object. The gate sensors 110 and the overhead sensors 112 used for sensing the object are radars that produce multiple point data references in three-dimensional space based on the sensing. Using a cluster technique to process the multiple point data references reduces computation and eases recognition in an area of interest that is the object. The cluster technique gives direction and magnitude to the point data references. Each of the gates 102 share the sensed data to the of the object recognition with other gates 102 in the transportation system 100. The gates 102 ensure that the object is uniquely detected and there are no cross references.

The representation 600A illustrates the multiple point data 602 or the point cloud data as detected by the radars of the gate sensors 110 and the overhead sensors 112. A center of point cluster (CPC) of the point data 602 is represented as 604. The first machine learning algorithm defines the CPC 604 of the point data. An outer limit of the multiple point data 602 is defined by the first machine learning algorithm. The outer limit 606 is identified around the gates 102 where the first machine learning algorithm captures a cluster of the point data 602 in order to detect the object.

Figure 6B:
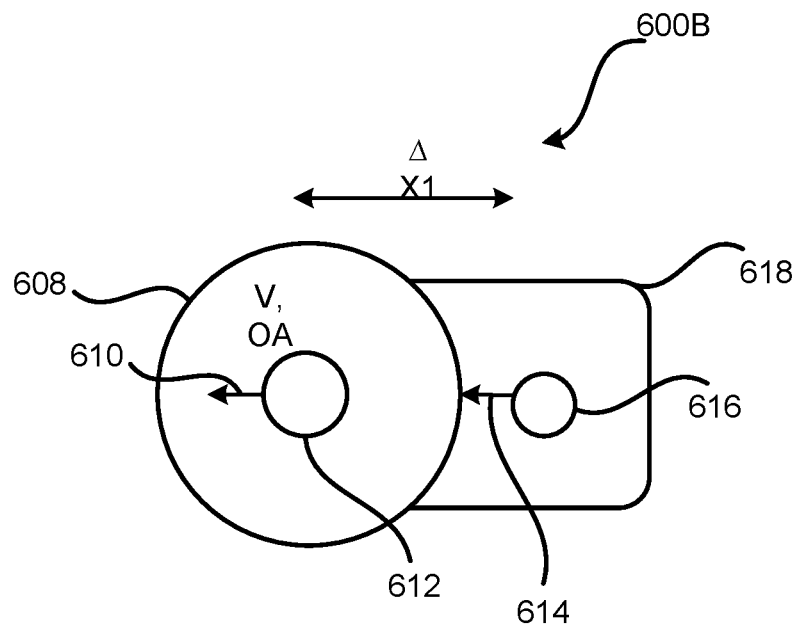
Figure 6B:
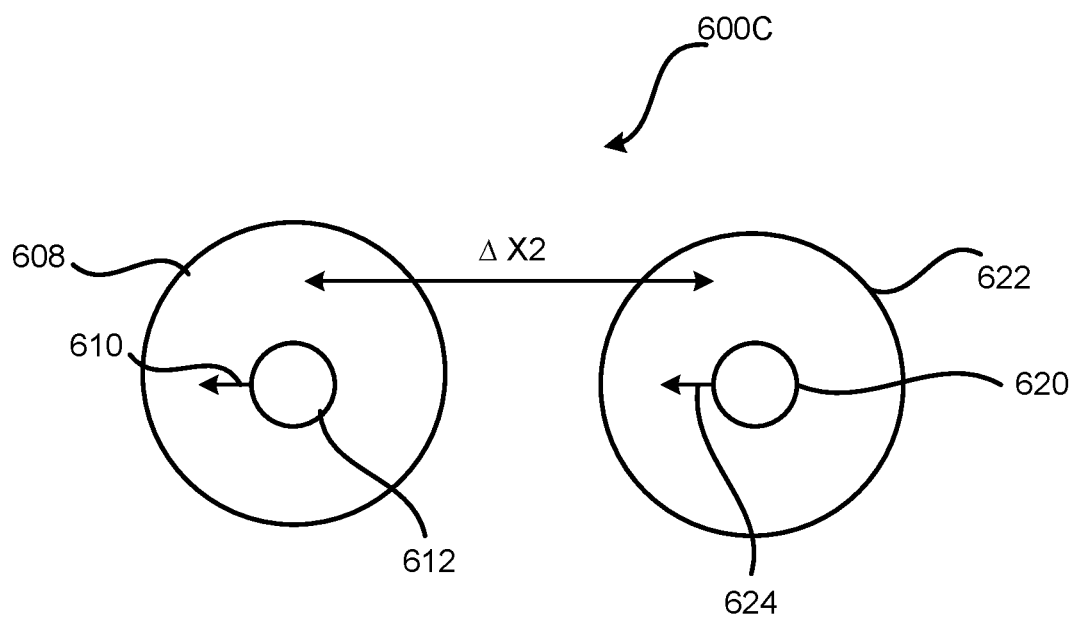

FIG. 6B illustrates vector analysis 600B and 600C of the objects detected from the spatial data of the radars of the gate sensors 110 and the overhead sensors 112. The object detection is performed using a vector analysis technique. A calculated target shape 608, 622 of the object is based on a cluster formed by the point data. Direction arrows 610, 614, and 624 indicates a calculated vector from the spatial data, moving at velocity V in direction OA. The CPCs 612, 616, and 620 are defined with intensity X and size Y. Another CPC 618 is defined with intensity A and size B. Based on the intensity and defined geometry profile/size of a radar reflection, a transit user (that is a human object) is detected. When alternate lower intensity of the radar reflection (for example, non-aqueous object) and shape is received, a presence of trailing/connected sub-objects is recognized.

The CPC technique defines two moving objects and tracks the relation between the two objects. Using vector analysis of the two objects or centers of discreet clusters, determine if they are paired or unpaired objects. That is whether a transit user is pulling a suitcase, or there are two separate transit users walking close but not as a single entity.

As illustrated in the vector analysis 600B, a CPC velocity and a radar intensity of the objects are determined and compared with a predetermined threshold values. The comparison is used to determine relation among the objects that help in the identification of the objects. If both objects represented by 608 and 618 show a differing radar intensity but share the CPC velocity delta of less than for example, <0.05%, then the objects may be differing yet paired and correlated by $\Delta X1$ values of set parameters. By way of an example, the transit user moving with the luggage or the transit user moving with a child.

As illustrated in the vector analysis 600C, if both objects represented by 608 and 622 show the similar radar intensity delta for example <1% however have the CPC velocity delta >0.05%, they may be similar objects unpaired, that is two transit users, correlated also by $\Delta X2$ values of the set parameters.

Figure 7:
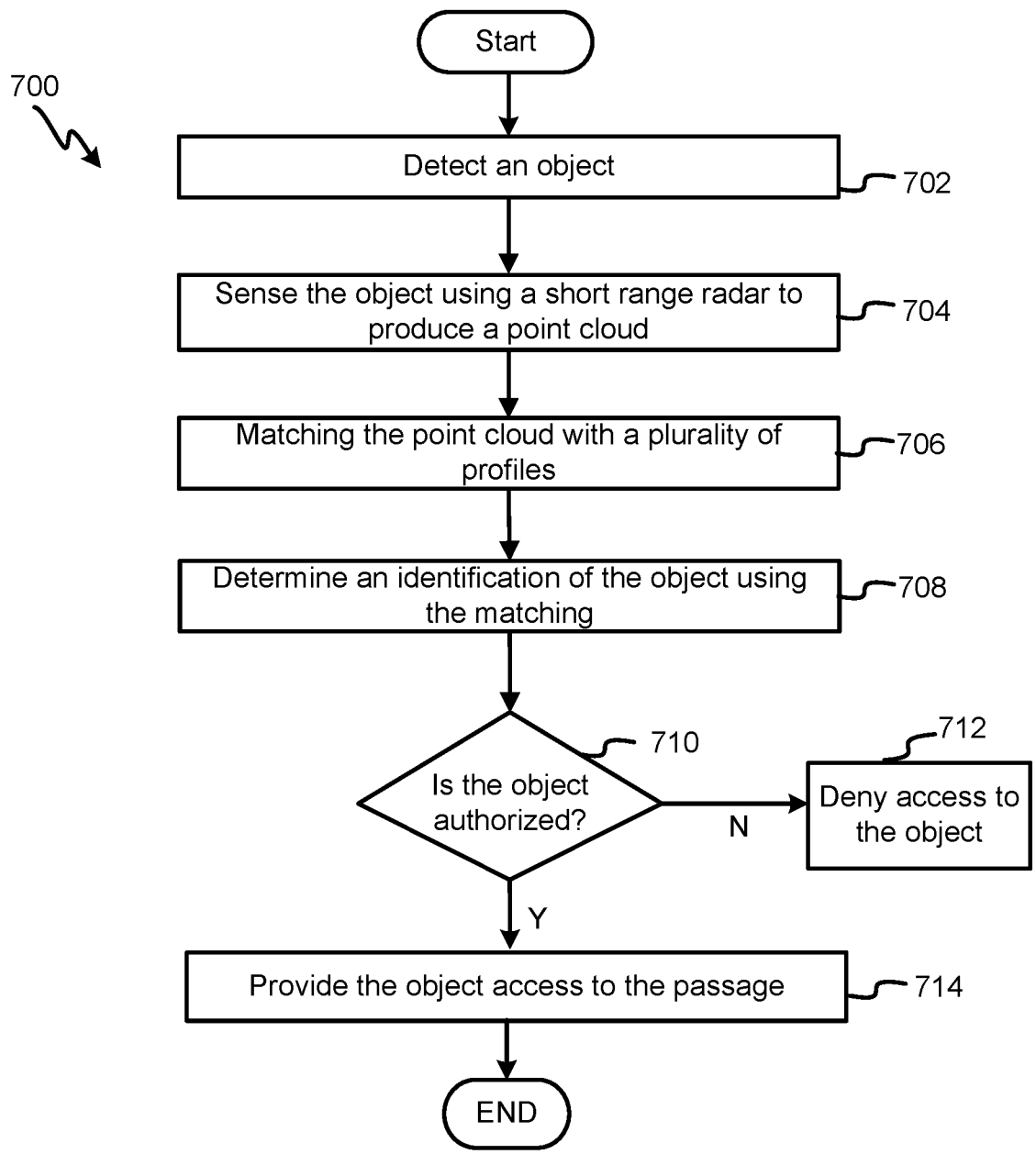
FIG. 7 illustrates a flowchart of a method for identifying an object within a predetermined distance from a gate of a transportation system.

FIG. 7 illustrates a method 700 for identifying an object within a predetermined distance from the gate 102 of the transportation system 100, in accordance with an embodiment of the present disclosure. The depicted portion of the method 700 starts at block 702 where an object is detected within the predetermined distance from the gate 102 using the gate sensors 110 and the overhead sensors 112. The object is moving towards the gate 102 in order to access the transportation system 100.

At block 704, the object near the gate 102 is sensed by the gate sensors 110 and the overhead sensors 112 to generate a point cloud of the object. The point cloud is represented as a spatial three-dimensional data which is used to perform vector analysis of the object.

At block 706, the point cloud of the object is matched with a plurality of profiles including a plurality of predetermined objects stored in the profile cache 508 of the cloud server 118. The match is performed using the first machine learning algorithm of the cloud server 118. The plurality of profiles includes matching information for the plurality of predetermined objects.

At block 708, an identification of the object is determined based on matching the point cloud of the object with the matching information of the plurality of predetermined objects. Clusters of cloud points of objects including the transit user along with his or her items are identified. The center point of cluster (CPC) associated with the clusters are identified to perform the vector analysis. Intensity and velocity of the spatial vectors of the clusters are compared with predetermined threshold values to determine whether the objects of the clusters are different transit users or the objects are associated with a same object.

At block 710, after the object has been identified, a check is performed to determine whether the object is authorized to pass through the gate 102 to access the transportation system 100. The authorization is performed using a second machine learning algorithm from the cloud server 118. For example, if the object is identified as the transit user travelling either alone or with a luggage, a handbag, and/or a child. In such a situation, the transit user is authorized to pass through the gate 102 at block 714, based on a verification of payment of a trip desired to be taken through the transportation system 100. However, if the object is identified as an unidentified object, a suspicious or a prohibited object, and/or a misplaced item, the object is denied authorization at block 712.

At block 714, the barrier 104 is moved from a closed position into an open position to provide access to the object to pass through the gate 102 based on the authorization. A timing profile for an increased duration for the barriers 104 to remain opened is identified when the transit user is travelling with the child or the transit user is carrying the luggage, and/or the transit user is a senior citizen. The barrier 104 is moved from the closed position into the open position based on the timing profile of the transit user.

Figure 8:
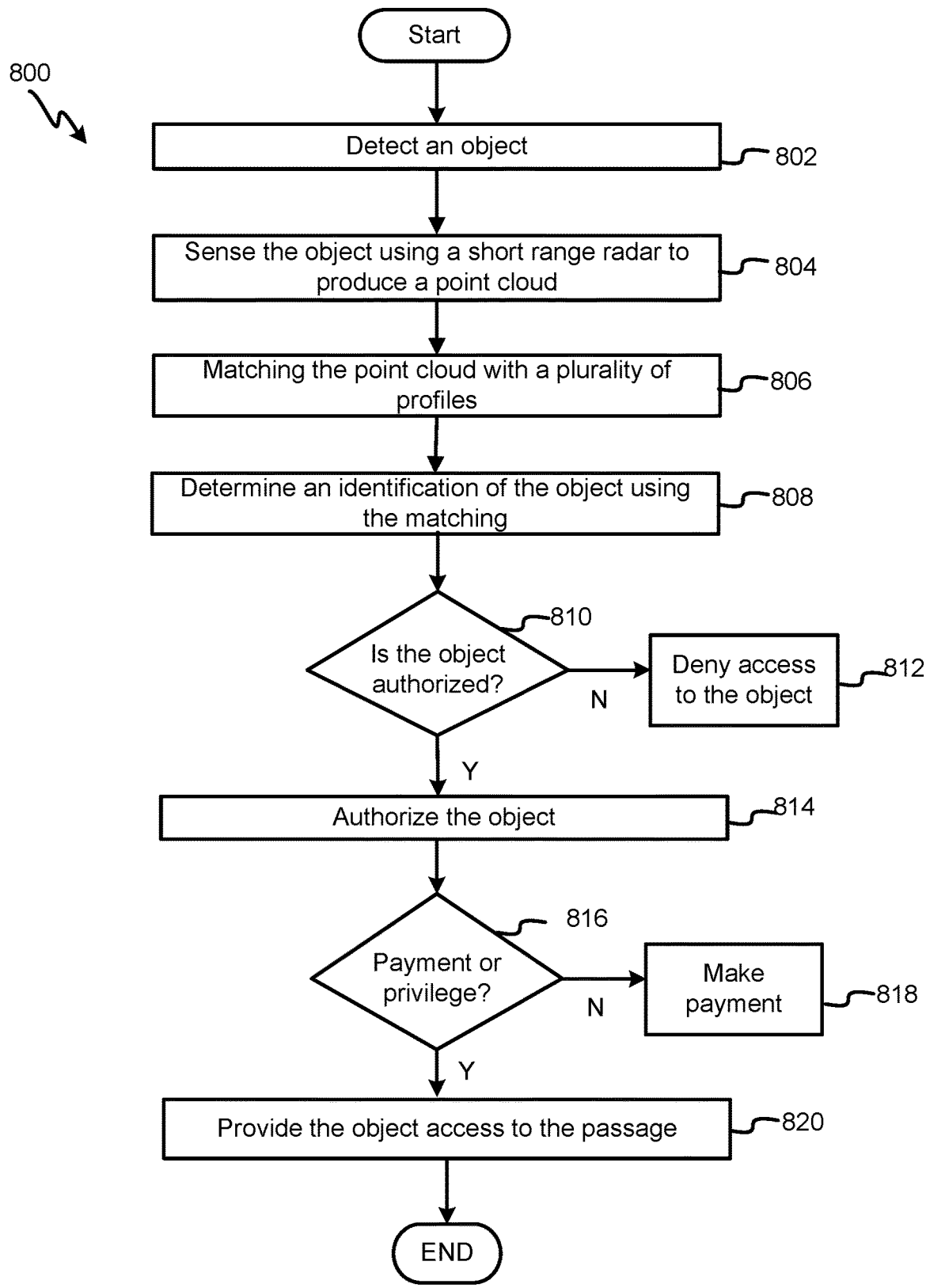
FIG. 8 illustrates a flowchart for identifying and authorizing an object within a predetermined distance from a gate of a transportation system.

FIG. 8 illustrates a method 800 for identifying and authorizing an object within a predetermined distance from the gate 102 of the transportation system 100, in accordance with an embodiment of the present disclosure. The depicted portion of the method 800 starts at block 802 where an object is detected within the predetermined distance from the gate 102 using the gate sensors 110 and the overhead sensors 112. The object is near the gate 102 in order to access the transportation system 100 using the gate 102.

At block 804, the object at the gate 102 is sensed by the gate sensors 110 and the overhead sensors 112 to generate a point cloud of the object. The point cloud is represented as a spatial three-dimensional data which is used to identify the object by matching with a plurality of predetermined objects and performing vector analysis of the object.

At block 806, the point cloud of the object is matched with the plurality of predetermined objects from a plurality of profiles. The plurality of profiles are stored in the profile cache 508 of the cloud server 118. The match is performed using the first machine learning algorithm of the cloud server 118. The plurality of profiles includes matching information for the plurality of predetermined objects.

At block 808, an identification of the object is determined based on matching the point cloud of the object with the matching information of the plurality of predetermined objects. Clusters of data points of objects including the transit user along with his items (if any) are identified. The center point of cluster (CPC) associated with the clusters are identified to perform the vector analysis. Intensity and velocity of the spatial vectors of the clusters are compared with predetermined threshold values to determine whether the objects of the clusters are different transit users or the objects are associated with a same object such as transit user with the luggage.

At block 810, a check is performed to determine whether the object is authorized to pass through the gate 102 to access the transportation system 100. The authorization is performed using a second machine learning algorithm from the cloud server 118. By way of an example, the object may be identified as the transit user travelling alone or with the luggage; a handbag, and/or a child. The transit user is authorized to pass through the gate 102 at block 814, based on a verification of a payment of a trip to be taken by the transit user through the transportation system 100. However, if the object is identified as an unidentified object, a threatened or a prohibited object, and/or a misplaced item, the object is denied authorization at block 812.

At block 816, the payment associated with the trip of the transit user is verified. A transit pass is received from the transit user either from a mobile device of the transit user; a card; an audio and/or visual verification; a barcode, QR code, and/or a coupon code; or other verification means. A term and/or amount of the transit pass is verified for the trip. In case the payment is complete and/or the transit user is privileged like a senior citizen and/or a child, the transit user is allowed access through the gate 102 at block 820. However, if the transit user has not paid for the trip or the transit pass has expired and/or the transit pass is invalid, then the transit user is notified to make the payment at block 818 in order to take the trip. Further, in case the object is the transit user with a child then the payment and/or the privileges associated with the child is also verified. Also, a timing profile for an increased duration for the barrier 104 to remain opened is identified when the transit user is travelling with the child or the transit user is carrying luggage, and/or the transit user is a senior citizen. In another embodiment, if the transit user is travelling with one or more sub-objects like the luggage, the handbag and/or a rucksack, a corresponding timing profile associated with the transit user with the one or more sub-objects may be identified.

At block 820, the barrier 104 is moved from a closed position into an open position based on the timing profile of the transit user. The timing of opening and closing of the barriers 104 is therefore modified based on a identification of the transit user and sub-objects with him. That is, whether the transit user is passing through the gate 102 alone, with a child, or with luggage.

Figure 9:
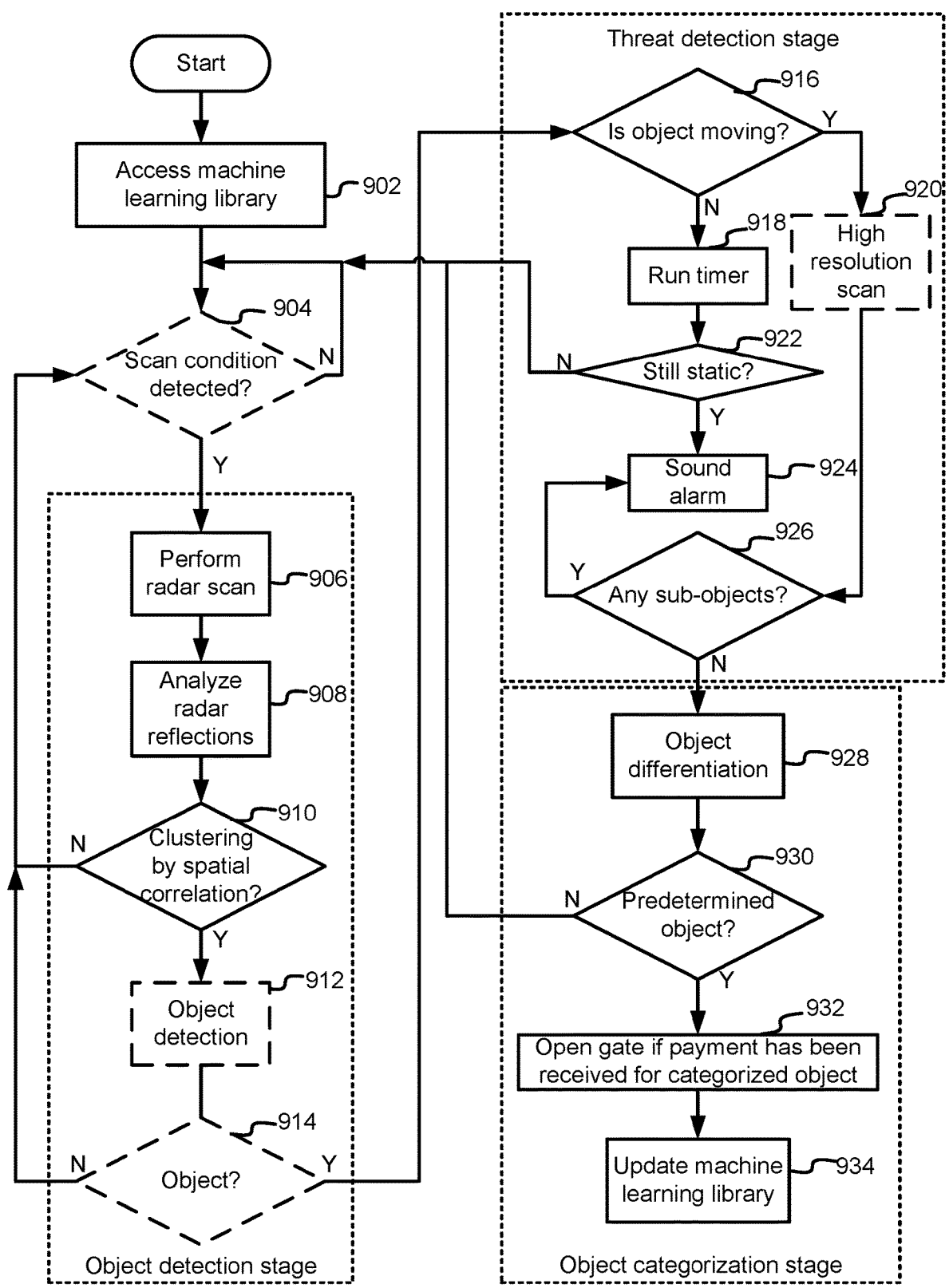
FIG. 9 illustrates a flowchart for detecting an object, identifying a threat and categorizing the object.

FIG. 9 illustrates a method 900 for detecting an object, identifying a threat and categorizing the object, in accordance with an embodiment of the present disclosure. The gate 102 may include a pair of the gate cabinets 106 with the barrier 104 on each of the gate cabinet 106. The gate 102 is opened using the barrier 104 to allow passage of the object based on an identification and authorization of the object. The object approaches the gate 102 to take a trip using the transportation system 100.

The depicted portion of the method 900 starts at block 902, where the gate 102 accesses a latest machine learning (ML) library from the cloud server 118. The machine learning library or machine learning model can be used to process radar reflections from various objects within a predetermined distance from the gate 102 to perform object detection and object categorization based on the radar reflections. The gate sensors 110 and the overhead sensors 112 at the gate 102 include radars that transmit radar reflections from the sensing of objects near the gate 102. The latest ML library is the most recently updated ML library. Data may be gathered from the gates 102 in the transportation system 100 and used to update the machine learning library in the cloud server 118.

At block 904, the gate 102 performs a radar scan based on whether or not a scan condition is detected. The scan condition may include, for example, detection of a transit user or objects nearby for example, in or near a range of the radar. This may be determined by the gate 102 itself using sensors such as Radio Frequency (RF) sensors, and/or pressure sensors, or may be determined by sensors and/or systems separate from, but in communication with, the gate 102. In another embodiment, the transportation system 100 may engage one or more tracking systems to track location of passengers within a transit station or other area within the transportation system 100. Such embodiments may enable gates to receive information indicative of whether one or more passengers are within the predetermined distance from the gate 102, travelling towards the gate 102, and/or located in a certain area or region adjacent to the gates 102. If no scan condition is detected, the gate 102 may wait to proceed until the scan condition is detected. Once the scan condition is detected, the gate 102 may perform the radar scan, as illustrated in block 904.

At block 906, the radar scan is performed. The radar scan is the first in a series of functions of an object detection stage. The functions of the object detection stage may be continuously performed, based on desired functionality. That is, the gate 102 may continue to perform radar scans and subsequent functions of the object detection stage. Alternatively, according to some embodiments, the gate 102 may continue to perform these functions as long as the scan condition is present. The scans may involve the use of the radars having a carrier frequency of 20 GHz or more, thereby enabling centimeters-level resolution, or better. In some embodiments, for example, the radar scan information may include spatial resolution (e.g., X and Y samples), along with intensity. Resulting in a radar "image" having intensities for each "pixel" within XY coordinate. Other embodiments may additionally scan depth resulting in a plurality of radar "images" at different depths, or a "volume" with X, Y, and Z pixels, thereby resulting in additional data that may be used for object detection/categorization stage. The radar scans produce a point cloud of the object which is further used in an identification of the object.

At block 908, point cloud data from the radar scan is analyzed using cluster vector analysis. The analysis may further include, as indicated in block 910, an analysis of whether there is a presence of clustering. If no clustering is detected, the process can revert back to determining whether a scan condition is detected at block 904 in performing a new scan at block 906.

At block 910, the point cloud data from the radar reflections are analyzed to determine whether clusters are present. The determination is based on a cluster vector analysis algorithm, such as a "center of point cluster (CPC) method". Such techniques can provide a number, a direction, and a magnitude of the objects. Moreover, such techniques may further identify and track the CPC of such clusters. Further, whether a cluster has a predetermined minimum dimension is determined. For example, based on minimum size for detectable objects, such as humans or a luggage. If the predetermined minimum dimension is satisfied for example, one or more of the outer dimensions of a detected cluster meet or exceed the predetermined minimum dimension, then the process optionally proceeds to object detection, at block 912. An initial clustering algorithm may be performed at blocks 908 and 910 to help make the analysis of the radar reflections more efficient by reducing "false positives," and/or reducing the amount of data processed at blocks 912 and 914 by providing only the data related to the cluster detected at block 910.

At block 912, the object is detected based on the cluster vector analysis. After the object is detected, the point cloud data of the object is matched with a set of predetermined objects from profiles stored in the profile cache 508 of the cloud server 118. The object is identified as either a transit user; the transit user with a luggage, a handbag, and/or a rucksack; and/or other items from the profiles. The matching is performed by a first machine learning algorithm of the cloud server 118.

At block 914, the first machine learning algorithm may determine whether or not the object is present. If the object is not present, the process can return to block 904 (or block 906,), and the gate 102 may perform additional radar scans. If the object is detected, the process can move to a threat detection stage at block 916.

At block 916, a threat detection stage begins which includes a series of functions performed by the gate 102 for determining whether a threat is present by the object. The threat is identified in the object. At block 916, it is determined whether the object is moving. Radar scans are used to determine whether the object is moving. If the object is not moving that is the object has not moved a threshold minimum distance within a threshold minimum time, a timer may then be started, as indicated at block 918.

At block 918, the time is started to track a time till the object is static. A length of the timer may vary, depending on desired functionality. Typically, in transit situations, the timer may be on the order of several seconds. This can be based, for example, on the average time it takes for a passenger to pass through the gate 102. In some environments, the timer may be set at a length of some multiplier times this average time for example, 2×, 5×, 10×, etc.

At block 922, after the timer elapses, it is determined whether the object is still static. If not, the process continues to take the radar scans, determine whether the object is present, and track the object through the gate 102. Else, if the object is still static that is does not move the threshold distance within the threshold amount of time, the process may perform the functionality of block 924, where it sounds an alarm. Depending on desired functionality, additional or alternative measures may be taken if the object is still static, such as raising a warning to transit officials, providing an audio or visual prompt to the passenger at the gate 102, etc.

If the object is determined to be moving, the process may optionally include performing a high-resolution scan, at block 920. Earlier radar scans may include a relatively lower-resolution scan. In other words, scans performed prior to the high-resolution scan may produce less data (e.g., having lower spatial resolution, lower intensity resolution, etc.). In contrast, the scan performed at block 920 may result in more data through higher spatial resolution, depth and/or other measurements, or higher intensity resolution. This additional information may be useful to determine whether any metallic sub-objects are present and/or to perform object differentiation.

At block 926, it is determined whether any sub-objects are present. Precisely, whether there are any sub-objects within the previously detected object detected at the object detection stage that have a higher intensity. Since metal is highly reflective of radar frequencies, these higher-intensity sub-objects may be indicative of metal objects carried by a passenger or within the passenger's luggage.

The determination of whether any sub-objects are present may be made using clustering algorithms and/or machine-learning models. The data may comprise reflection intensity exceeding a minimum threshold level for example, higher than the reflections of a non-metallic object. Moreover, depending on capabilities of the machine-learning models, a determination of the type of subject object may also be determined. For example, the type may be firearm or other weapon, belt buckle, mobile phone, etc. If a sub-object determined is not identifiable or is identified as a firearm or other threat the process can proceed to block 924, where the alarm is sounded. If no sub-objects are found or if a sub-object is determined not to be a threat the process can proceed to the object categorization at block 928.

The radar may need to operate in a high frequency band (e.g., 130-150 GHz) to accurately detect metal objects. Utilizing a lower-resolution frequency (e.g., 62 GHz or 77 GHz) may be unable to accurately determine certain types of detected metal objects. If such is the case (or in other instances in which unknown objects are detected), embodiments may choose to notify authorities (e.g., send a warning to a system observer) rather than sound an alarm at the gate 102.

At block 928, an object categorization stage may be performed to identify the type of object detected in the object detection stage. At block 928, the radar data is fed to the machine-learning algorithm to categorize the type of object detected. The first machine learning algorithm may be stored locally at the gate 102 to help ensure fast processing of the radar data. or maybe remote at the cloud server 118. As indicated at block 930, if the object is predetermined, the process may fall back to the function at block 904 or 906, by determining whether the scan condition is present or performing more radar scans.

When determining whether the object is a known object, the first machine learning algorithm can analyze the radar data to determine whether the object includes an object acceptable for passing through the gate 102. That is, the first machine learning algorithm may classify the object as an adult, a child, or a piece of luggage. If the object is not identified or categorized as any of these types of objects, the gate 102 may remain shut. Otherwise, as indicated at block 932, the gate 102 may open if the object is a known object type, and confirmation of payment has been received for that type of object. The authorization of the object based on the payment is performed by a second machine learning algorithm of the cloud server 118.

The second machine learning algorithm may choose to open the gate 102 if the object is identified as the transit user, and if payment has been received for a trip of the transit user through the transportation system 100. The determination of whether payment is received may be based on fair media presented by the transit user at the gate 102. The second machine learning algorithm determines that there are multiple objects including the transit user and one or more pieces of luggage. The second machine learning algorithm may determine to open the gate 102 if the payment has been received for the transit user. On the other hand, if there are multiple transit users identified, or if the transit user and a child have been of identified, and if payment is required for each transit users (adults) or child that passes through the gate 102, the second machine learning algorithm may allow the gate 102 to remain closed till the payment is not for each adult and/or the child.

At block 934, the gate 102 may update the machine learning library, in view of the determination made by the first machine learning algorithm. This may help build a data set on which the first machine learning algorithm is based, making it more robust. In some embodiments, the radar data may be uploaded to the cloud server 118 to help refine/update the machine learning library maintained by the cloud server 118 and propagated to gates 102 throughout the transportation system 100. In this manner, the machine learning library can be refined over time, becoming increasingly accurate.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A transportation system for identifying an object using a short range radar at a transportation gate, the transportation system comprising:
 the short range radar is configured to:
  determine the object within a predetermined distance from the transportation gate, and
  sense the object at the transportation gate to generate a point cloud, wherein the object includes one or more items associated with each other; and
 a cloud server comprising a machine learning library, wherein the machine learning library comprises a plurality of machine learning algorithms, the cloud server is configured to:
  determine an identification of the object based on sensed data of the object using a first machine learning algorithm, wherein:
   the identification is determined based on matching the point cloud with a plurality of profiles;
   the plurality of profiles includes matching information for a plurality of predetermined objects; and
   the object is selected from the plurality of predetermined objects using the matching information,
  determine an authorization for the object to pass through the transportation gate using a second machine learning algorithm, wherein a subset of the plurality of predetermined objects are authorized, and
  in response to determination of the authorization, either authorize a passage through the transportation gate or flag the object as being unauthorized.

2. The transportation system for identifying the object using the short range radar at the transportation gate as recited in claim 1, wherein the object is two or more items.

3. The transportation system for identifying the object using the short range radar at the transportation gate as recited in claim 1, wherein the cloud server is further configured to:
 receive a transit pass associated with the object when the object is authorized to pass through the transportation gate;
 determine a payment or privilege associated with the transit pass using the second machine learning algorithm; and
 authorize the passage through the transportation gate based on the payment or the privilege associated with the transit pass.

4. The transportation system for identifying the object using the short range radar at the transportation gate as recited in claim 1, wherein the cloud server is further configured to determine whether a scan condition is detected, wherein the sensed the object at the transportation gate is responsive to determination that the scan condition is detected.

5. The transportation system for identifying the object using the short range radar at the transportation gate as recited in claim 1, wherein the point cloud is generated by cluster detection of spatial data obtained from the sensed the object using the short range radar.

6. The transportation system for identifying the object using the short range radar at the transportation gate as recited in claim 1, wherein the cloud server is further configured to determine identification of sub-objects based on the data from the sensed object, wherein the sub-objects have a first minimum threshold intensity in the data from the sensed object that is higher than a second minimum threshold intensity for the object.

7. The transportation system for identifying the object using the short range radar at the transportation gate as recited in claim 1, wherein the cloud server is further configured to determine whether the object moves a threshold distance within a threshold amount of time.

8. The transportation system for identifying the object using the short range radar at the transportation gate as recited in claim 1, wherein the cloud server is further configured to update the plurality of profiles based on the identification of the object using the first machine learning algorithm.

9. The transportation system for identifying the object using the short range radar at the transportation gate of claim 1, wherein the authorization of the passage for the object includes opening barriers of the transportation gate, and wherein the flag associated with the object includes generation of alerts to a transit personnel using sound alarms, and/or visual indications.

10. A method of identifying an object using a short range radar at a transportation gate, the method comprising:
 detecting the object within a predetermined distance from the transportation gate;
 sensing the object at the transportation gate using the short range radar to generate a point cloud, wherein the object includes one or more items associated with each other;
 determining an identification of the object based on data from the sensing using a first machine learning algorithm, wherein:
  the identification is determined based on matching the point cloud with a plurality of profiles,
  the plurality of profiles includes matching information for a plurality of predetermined objects, and
  the object is selected from the plurality of predetermined objects using the matching information;
 determining an authorization for the object to pass through the transportation gate using a second machine learning algorithm, wherein a subset of the plurality of predetermined objects are authorized; and
 in response to determining the authorization, either authorizing a passage through the transportation gate or flagging the object as being unauthorized.

11. The method of identifying the object using the short range radar at the transportation gate as recited in claim 10, wherein the object is two or more items.

12. The method of identifying the object using the short range radar at the transportation gate as recited in claim 10, further comprising:
 receiving a transit pass of the object when the object is authorized to pass through the transportation gate;
 determining a payment or privilege associated with the transit pass using the second machine learning algorithm; and
 authorizing the passage through the transportation gate based on the payment or the privilege associated with the transit pass.

13. The method of identifying the object using the short range radar at the transportation gate as recited in claim 10, wherein the point cloud is generated by performing cluster detection of spatial data obtained from the sensing of the object using the short range radar.

14. The method of identifying the object using the short range radar at the transportation gate as recited in claim 10, wherein the plurality of predetermined objects include a transit user or a piece of a luggage.

15. The method of identifying the object using the short range radar at the transportation gate as recited in claim 10, further comprising determining identification of sub-objects based on the data from the sensing, wherein the sub-objects have a first minimum threshold intensity in the data from the sensing that is higher than a second minimum threshold intensity for the object.

16. The method of identifying the object using the short range radar at the transportation gate as recited in claim 10, further comprising determining whether the object moves a threshold distance within a threshold amount of time.

17. The method of identifying the object using the short range radar at the transportation gate as recited in claim 10, further comprising updating the plurality of profiles based on the identification of the object using the first machine learning algorithm.

18. A non-transitory computer-readable medium having instructions stored thereon, wherein the instructions, when executed by one or more processors of a transportation system, cause the transportation system to:
  detect an object within a predetermined distance from a transportation gate of the transportation system;
  sense the object at the transportation gate using a short range radar to generate a point cloud, wherein the object includes one or more items associated with each other;
  determine an identification of the object based on data from the sensed object using a first machine learning algorithm, wherein:
    the identification is determined based on matching the point cloud with a plurality of profiles,
    the plurality of profiles includes matching information for a plurality of predetermined objects, and
    the object is selected from the plurality of predetermined objects using the matching information;
  determine an authorization for the object to pass through the transportation gate using a second machine learning algorithm, wherein a subset of the plurality of predetermined objects are authorized; and
  in response to determination of the authorization, either authorize a passage through the transportation gate or flag the object as being unauthorized.

19. The non-transitory computer-readable medium as recited in claim 18, wherein the point cloud is generated by cluster detection of spatial data obtained from the sensed the object using the short range radar.

20. The non-transitory computer-readable medium as recited in claim 18, wherein the one or more processors of the transportation system are further configured to determine identification of sub-objects based on the data from the sensed object, wherein the sub-objects have a first minimum threshold intensity in the sensed data that is higher than a second minimum threshold intensity for the object.

* * * * *